United States Patent
Vecht et al.

(10) Patent No.: US 6,379,585 B1
(45) Date of Patent: Apr. 30, 2002

(54) PREPARATION OF SULPHIDES AND SELENIDES

(76) Inventors: Aron Vecht, 95 Corringham Road, London NW11 7DL; David William Smith, 22 St. Mary's View, Saffron Walden, Essex CB10 2GF, both of (GB)

( * ) Notice: Subject to any disclaimer, the term of this patent is extended or adjusted under 35 U.S.C. 154(b) by 0 days.

(21) Appl. No.: 09/455,778

(22) Filed: Dec. 7, 1999

Related U.S. Application Data

(63) Continuation of application No. PCT/GB98/01547, filed on May 27, 1998.

(30) Foreign Application Priority Data

Jun. 7, 1997 (GB) .............................................. 9711799

(51) Int. Cl.$^7$ ................................................ C01G 1/12
(52) U.S. Cl. .......................... 252/301.65; 252/301.45; 423/503; 423/509; 423/511; 423/561.1; 423/566.1; 423/566.3; 423/656
(58) Field of Search .................................. 423/508, 509, 423/511, 561.1, 656, 566.1, 566.3; 252/301.45, 301.65

(56) References Cited

U.S. PATENT DOCUMENTS

| | | | | |
|---|---|---|---|---|
| 2,421,207 A | * | 5/1947 | Leverenz | 252/301.6 S |
| 3,714,339 A | * | 1/1973 | Vecht | 423/508 |
| 3,957,678 A | * | 5/1976 | Dikhoff et al. | 252/301.6 S |
| 4,859,361 A | * | 8/1989 | Reilly et al. | 252/301.6 S |

FOREIGN PATENT DOCUMENTS

| | | |
|---|---|---|
| GB | 1 314 522 | 4/1993 |
| JP | 60-155506 | * 8/1985 |

OTHER PUBLICATIONS

Chemical abstract citation 119:120593, abstract for Koverda et al, "Zinc Sulfide Precipitation From Zincate Solutions by Elemental Sulfur in the Presence of a Reducing Agent", Zn. Prikl. Khim., 66(1), pp. 212–214, 1993.*
Meyer, "Eine Neue Darstellungsweise Kolloiden Schwefels und Selens", Ber. vol. 46, No. 406, pp. 3089–3091, 9/13.*
E. W. Schmidt, Hydrazine and its Derivatives, John Wiley (1984), pp. 289–290.
Welsh et al., Anhydrous Hydrazine. III. Anhydrous Hydrazine as a Solvent, J. Am. Chem. Soc., vol. 37, 1915, pp. 816–824.
Welsh et al., Anhydrous Hydrazine. IV. Chemical Reactions in Anhydrous Hydrazine, J. Am. Chem. Soc., vol. 37, 1915, pp. 825–832.
Meyer, Eine Neue Darstellungsweise Kolloiden Schwefels und Selens, Ber., vol. 46, No. 406, Sep. 1913, pp. 3089–3091.
Chemical Abstracts, vol. 119, No. 12, Sep. 20, 1993, Columbus, Ohio,US; abstract No. 120593, Koverda, A. et al: "Zinc sulfide precipitation from zincate solutions by elemental sulfur in the presence of a reducing agent" XP002075067 see abstract & ZH. Prikl. Khim. (S.–Peterburg) (1993). 66(1), 212–14 Coden: ZPKHAB; ISSN: 0044–4618.
Chemical Abstracts, vol. 85, No. 22, Nov. 29, 1976 Columbus, Ohio, US: abstract No. 171240, Padma, D.K. et al: "Estimation of elemental sulfur with hydrazine hydrate " XP XP002075068 see abstract & Res. TND. (1976), 21 (1), 32–4 Coden: RSIDAO.
Chemical Abstracts, vol. 127, No. 24, Dec. 15, 1997 Columbus, Ohio, US: abstract No. 332640, Saraswathi, K. et al: "Semi–automatic determination of elemental sulfur in rubber" XP002075071 see abstract & J. Autom. Chem. (1997), 19(5), 153–156 Coden:JAUCD6; ISSN: 0142–0453.
Chemical Abstracts, vol. 116, No. 10, Mar. 9, 1992 Columbus, Ohio, US: abstract No. 98519, Srivastava, S.K. et al: "Preliminary polarographic studies of sulfur and selenium solutions in hydrazine hydrate" XP002075072 see abstract & Bull. Chem, Soc. JPN (1991), 64(12), 3662–4 Coden: BCSJA8:ISSN: 0009–2673.
Chemical Abstracts, vol. 125, No. 26, Dec. 23, 1996 Columbus, Ohio, US: abstract No. 333284, Deryagina, E.N. et al: "Method for dissolving elemental sulfur using hydrazine–hydrate–alkali mixture as dissolving medium " XP002075069 see abstract & SU1 385 445 A (IRKUTSKIJ Institut Organicheskoj Khimii SO AN SSSR, USSR).

* cited by examiner

*Primary Examiner*—C. Melissa Koslow
(74) *Attorney, Agent, or Firm*—Pillsbury Winthrop LLP

(57) ABSTRACT

Sulphides and selenides are prepared by dissolving sulphur or selenium in an aqueous or non-aqueous solution of hydrazine hydrate. The solution is combined with a solution of an appropriate cation to precipitate the corresponding sulphide or selenide. Solutions of two or more cations may be used to produce ternary compounds of sulphur and selenium, for example thio-gallates. Likewise both sulphur and selenium can be used together to produce sulphoselenides. The method is particularly applicable to the production of doped phosphors by the inclusion of solutions containing the appropriate dopant.

11 Claims, No Drawings

PREPARATION OF SULPHIDES AND SELENIDES

This is a Continuation of International Appln. No. PCT/GB98/01547 filed May 27, 1998.

This invention relates to the preparation of sulphides and selenides, including related compounds, for example thiogallates. The invention has application in the synthesis of phosphors, pigments, ceramics and optoelectronic materials. The phosphors may be used for photoluminescence, high and low voltage cathodoluminescence, as well as for AC or DC electroluminescence. The phosphors can also be used in x-ray applications and for thermoluminescent storage.

Known methods of preparing sulphides and selenides are:

i) the reaction between gaseous hydrogen sulphide or hydrogen selenide and a solution containing the appropriate cation, and ii) the thermal and/or catalytic decomposition of an organo-sulphur or organo-selenium compound in a solution containing the desired cation.

Typical of the reagents employed in the second method are thiourea, thioacetamide and selenourea. This method employs controlled release of the anionic species uniformly throughout the reaction container and is commonly known as homogeneous precipitation.

Both methods have some disadvantageous features. In the first method the use of highly toxic gaseous reagents can be extremely hazardous. In addition, it is believed that this method leads to the precipitation of non-stoichiometric materials having an irregular, plate-like morphology. As to the second method, the principal disadvantage of most organo-sulphur or organo-selenium compounds is their high cost. A further disadvantage is that the precipitated product is usually contaminated with the organic starting compound. It is an object of the invention to provide a method of preparing sulphides and selenides in which the above disadvantages are mitigated.

According to the invention a method of preparing sulphides and selenides comprises the steps of dissolving sulphur or selenium in hydrazine hydrate and then combining the resulting solution with a solution of an appropriate cation to precipitate the corresponding sulphide or selenide.

In some embodiments the hydrazine hydrate is used in an aqueous solution.

It is known that sulphur, but not selenium, shows solubility in anhydrous hydrazine. However the use of this compound as a solvent is not really practical as it is well-known that it is highly reactive. It has also been reported that a slow reaction takes place when sulphur is mixed with hydrazine hydrate. Such reports lead to the expectation that hydrazine hydrate is not of practical use as a quantitative solvent for these elements. Unexpectedly it has now been found that both sulphur and selenium dissolve in hydrazine hydrate sufficiently rapidly to enable binary and ternary compounds of these elements to be prepared in quantity.

An important feature of the method described herein is the dissolution of elemental sulphur or selenium, which can be of a high purity, by chemical reaction with hydrazine. This may be expressed as:

(where X=S or Se)

The hydrazine is preferably in form of hydrazine hydrate or a solution thereof.

In order to yield stable and usable solutions an excess of hydrazine hydrate with an approximately 2:1 mole ratio or greater of hydrazine hydrate to X is desirable. The solution can subsequently be diluted with de-gassed water or a suitable organic solvent such as N,N-dimethyl-formamide or dimethylsulphoxide. If maintained in a sealed container solutions produced in this way can be stored for a long time. The simple mixing of such a sulphur or selenium bearing solution with a solution of the desired cation leads to the rapid precipitation of the respective sulphide or selenide.

The precipitation technique lends itself to the preparation of amorphous or crystalline sulphides, depending on the conditions of precipitation and subsequent heat treatments. Thus, smaller particles can be produced by precipitation in organic solvents such as methyl alcohol, ethyl alcohol, N,N-dimethyl-formamide or dimethylsulphoxide.

In general, sulphides can be precipitated from aqueous solutions. Aqueous solutions can be used in the formation of sulphides of elements of Groups IIB, IIIA, IVA and VA of the periodic table from which phosphors of chemical formulas such as ZnS:Mn, ZnS:Ag and ternary compounds of formulas such as $Zn_xCd_{1-x}S:Ag$ (where $1 \geq x \geq 0$), ZnS:Cu and ZnS:Mn,Cu may be synthesised. Sulphides can also be precipitated from aqueous solutions of compounds containing the transition elements. Transition elements are defined herein as elements which have partly filled 'd' or 'f' shells including elements that have partly filled 'd' or 'f' shells in any of their oxidation states. Compounds of elements of the following sub-groups, namely: gallium, indium and thallium; germanium, tin and lead; and arsenic, antimony and bismuth; can also be prepared. Furthermore the invention is not limited to the use of aqueous solutions and non-aqueous solutions of hydrazine hydrate can also be used.

It is also possible to produce precursors for Group IIA sulphides and selenides and ternary sulphides and selenides (such as thiogallates, seleno-gallates and sulpho-seleno-gallates) from aqueous solutions by treating with suitable alkalis or alkaline carbonates such as ammonium carbonate. From such solutions compounds such as barium zinc sulphide and a range of thiogallates, for example zinc thiogallate and strontium thiogallate, can be prepared. These compounds can be suitably mixed with activator elements or compounds such as manganese, bismuth or copper for example or with rare earth elements such as europium or cerium, during the precipitation stage or later. These compounds or mixtures may then be fired at a higher temperature in suitable atmospheres, for example sulphur, nitrogen argon or air, to produce efficient phosphors. Thus phosphors having formulas such as $Ba_2ZnS_3:Mn$, $ZnGa_2S_4:Mn$ and $SrGa_2S_4:Mn$ can be produced by this method.

Selenides of the elements referred to above can similarly be precipitated from solutions containing the appropriate cations. Selenides that are particularly sensitive to oxidation may be precipitated in the presence of an inert or aprotic non-aqueous solvent such as N,N-dimethyl-formamide. A particular example of this requirement is found in the precipitation of zinc selenide. In this case, a buff-coloured precipitate of solvated zinc selenide is initially formed. The solvent is removed by heating the precipitate in an inert atmosphere to a temperature in the range 200–400° C. The heating may be carried out under reduced pressure.

The selenides of the other elements can also be produced in this way. In addition, ternary compounds such as compounds of formula $ZnS_xSe_{1-x}$ may be precipitated by employing a single solution of hydrazine hydrate containing both dissolved sulphur and dissolved selenium. It is also possible to precipitate ternary compounds of formula such as $CuInSe_2$ or $CuInS_2$ by including copper and indium cations in the solution that is mixed with the hydrazine hydrate solution.

Methods embodying the invention can readily be used to produce not only phosphors but also a range of photoconducting materials such as doped cadmium sulphide. In addition these methods can also be used to produce sulphide and selenide based pigments from a range of metal solutions containing copper, silver or iron for example.

The advantages of the methods described herein over alternative methods are:
i) the preparation of high purity sulphides and selenides and mixtures thereof,
ii) low production costs in comparison with methods using organic thio or seleno reagents,
iii) avoidance of the enormous costs associated with the removal of hydrogen sulphide or selenium sulphide.

Some examples of carrying out the invention will now be described.

EXAMPLE 1

In this example zinc sulphide is produced. 44 g of zinc acetate, of formula $Zn(CH_3CO_2)_2H_2O$, is dissolved in 80 ml of hot water. The hot water is for the purpose of speeding up the solution of zinc acetate. 8 g of sulphur is slowly added to 60 ml of hydrazine hydrate, $N_2H_4H_2O$. The dissolved solution of sulphur is then slowly added to the zinc acetate solution while stirring. Zinc sulphide is precipitated as a yellow solid. Stirring is continued for a further half-hour and the precipitate is then filtered and washed with a liter of water and dried at 120° C.

EXAMPLE 2

In this example copper selenide is produced. 20 g of copper acetate, of formula $Cu(CH_3CO_2)_2H_2O$, is dissolved in 200 ml of water and the solution is filtered. 7.9 g of powdered selenium is dissolved in a minimum quantity of hydrazine hydrate, $N_2H_4H_2O$, and then added to the copper acetate solution. The resulting mixture is stirred for three hours after which the black precipitate of copper selenide is filtered, washed with water and dried.

EXAMPLE 3

In this example a phosphor comprising manganese doped barium zinc sulphide is produced. 3.9 g of sulphur is added to 30 ml of hydrazine hydrate, $N_2H_4H_2O$, while stirring. An orange solution is formed. To this solution a previously prepared aqueous solution of 15.3 g of barium acetate, $Ba(CH_3CO_2)_2$, in 40 ml of water is added. After a few minutes of stirring a solution of 6.6 g of zinc acetate, $Zn(CH_3CO_2)_2 2H_2O$, and 0.11 g of manganese acetate, $Mn(CH_3CO_2)_2 4H_2O$, in 40 ml of water is added. A copious yellow precipitate is formed and stirring continues for ten minutes after which a solution of 9.4 g of a commercially available ammonium bicarbonate/ammonium compound mixture, of formula $NH_4HCO_3:NH_2CO_2NH_4$ and commonly called "ammonium carbonate", in 100 ml of water is added. The mixture is stirred for a further 45 minutes and then filtered. The precipitate is washed with a litre of water and dried at 110° C.

The washed and dried precipitate is fired in a silica boat under argon for 30 minutes at 800° C. The resultant phosphor luminesces bright red when excited at 366 nm.

EXAMPLE 4

In this example a phosphor comprising strontium thiogallate doped with europium is produced. 2.4 g of sulphur is dissolved in 15 ml of hydrazine hydrate, $N_2H_4H_2O$. A solution of 4 g of strontium chloride, $SrCl_2 6H_2O$, in 25 ml of water is then added followed by the addition of a solution of 5.28 g of gallium chloride in 20 ml of water. The mixture is stirred for a few minutes and then a solution of 2.65 g of the "ammonium carbonate" referred to above in 30 ml of water is added. The mixture is stirred for a further 30 minutes and the resultant precipitate is removed by filtration, washed with water and dried at 110° C.

0.15 g of europium acetate, $Eu(CH_3CO_2)_3 4H_2O$, and 0.026 g of sodium chloride are slurried with the dried precipitate using 2-propanol. This is dried and the mixture fired at 900° C. under argon for one hour. The resultant phosphor luminesces bright green when excited at 366 mn.

EXAMPLE 5

In this example a phosphor comprising silver doped zinc sulphide is produced. 200 g of zinc acetate, $Zn(CH_3CO_2)_2 2H_2O$, is dissolved in a liter of water. 35 g of sulphur is added to 125 ml of hydrazine hydrate, $N_2H_4H_2O$. The dissolved sulphur solution is then slowly added to the to the zinc acetate solution while stirring. Stirring is continued for a further half-hour and the resulting yellow precipitate is then filtered and washed with 2.5 l of water.

The precipitate is then resuspended in a liter of water and 10 ml of 0.2% silver nitrate solution is slowly added while stirring. The suspension is filtered and washed with 500 ml of water followed by 100 ml of 2-propanol. The precipitate is then transferred to a basin and 20 g of sodium chloride previously dissolved in 50 ml of hot water is slurried in. The mixture is dried at 110° C. The resultant powder is ground, packed into silica crucibles, covered with a fine layer of sulphur and fired at 900° C. for 30 minutes. The resultant phosphor luminesces a bright blue when excited at 366 nm or under cathode ray excitation.

EXAMPLE 6

In this example an electroluminescent phosphor comprising copper doped zinc cadmium sulphide is produced. Firstly the procedure described in the first paragraph of Example 5 for producing a yellow precipitate is carried out. The precipitate is then dried at 110° C. and crushed. 46.3 g of the dry crushed precipitate is ball-milled with 3.6 g of cadmium sulphide, 1.0 g of copper acetate, 2.0 g of sulphur and 1.0 g of ammonium bromide.

The powder is transferred to a silica boat and covered with a lid. The boat is placed in a silica tube and fired in an atmosphere comprising a mixture of argon and sulphur vapour at 720° C. After 2 hours the tube and its contents are removed from the furnace and rapidly cooled. The contents of the boat are gently ground to a fine powder, replaced in the boat and fired in static air at 720° C. for one hour and then again cooled rapidly. The resultant phosphor is ground, and washed with a solution of 3% sodium cyanide and 1% sodium hydroxide in water. The powder is filtered off, washed well with water and dried at 110° C. The resultant phosphor luminesces green when excited at 366 nm or under electroluminescent excitation.

What is claimed is:

1. A method of preparing sulphides and selenides comprising dissolving sulphur or selenium in a solution consisting essentially of an aqueous solution of hydrazine hydrate at room temperature, and then combining the resulting solution with a solution of an appropriate cation to precipitate the corresponding sulphide or selenide.

2. The method as claimed in claim 1 in which an excess of hydrazine hydrate is used with an at least 2:1 mole ratio of hydrazine hydrate to the sulphur or selenium.

3. The method as claimed in claim 1 in which the cation is selected from one or more of the transition elements or elements in Groups IIA, IIB, IIIA, IVA and VA of the periodic table.

4. The method as claimed in claim 3 in which the cation is selected from elements of Group IIA of the periodic table and the resultant precipitate is treated with ammonium carbonate.

5. The method as claimed in claim 3 in which the cation is selected from elements of Group IIA of the periodic table, the hydrazine hydrate is used in aqueous solution and alkali is added to the solution.

6. The method as claimed in claim 1 in which the precipitate is mixed with a suitable activator and subsequently fired to produce a phosphor.

7. The method as claimed in claim 6 in which the activator comprises one or more elements selected from manganese, bismuth, copper, silver or a rare earth element.

8. The method as claimed in claim 1 in which both sulphur and selenium are dissolved in the hydrazine hydrate to precipitate a sulpho-selenide compound.

9. The method as claimed in claim 1 in which more than one cation is combined with the solution to precipitate a ternary compound.

10. A method of preparing sulphides and selenides comprising dissolving sulphur or selenium in a solution consisting essentially of hydrazine hydrate at room temperature, followed by combining the resulting solution with a solution of a cation selected from any one or more of the elements gallium, indium, thallium, germanium, tin, lead, arsenic, antimony and bismuth to precipitate the corresponding sulphide or selenide.

11. A method of preparing selenides comprising dissolving selenium in the hydrazine hydrate in the presence of an inert or aprotic non-aqueous solvent at room temperature, followed by combining the resulting solution with a solution of an appropriate cation to precipitate the corresponding selenide.

* * * * *